(12) United States Patent
Nicot et al.

(10) Patent No.: US 7,032,912 B2
(45) Date of Patent: Apr. 25, 2006

(54) ROTATING INSTRUMENTED SUSPENSION STOP FOR MEASURING VERTICAL FORCES

(75) Inventors: Christophe Nicot, Quintal (FR); Olivier Blanchin, Annecy (FR)

(73) Assignee: S.N.R. Roulements, Annecy (FR)

( * ) Notice: Subject to any disclaimer, the term of this patent is extended or adjusted under 35 U.S.C. 154(b) by 138 days.

(21) Appl. No.: 10/712,030

(22) Filed: Nov. 14, 2003

(65) Prior Publication Data
US 2004/0104552 A1 Jun. 3, 2004

(30) Foreign Application Priority Data
Nov. 27, 2002 (FR) .................................. 02 14899

(51) Int. Cl.
*F16C 19/12* (2006.01)
*F16F 9/54* (2006.01)
*B60G 13/00* (2006.01)
*G01L 1/04* (2006.01)

(52) U.S. Cl. ...................... 280/124.147; 280/124.155; 280/5.5; 267/267; 267/269; 267/270; 384/448

(58) Field of Classification Search ......... 280/124.147, 280/124.155, 5.5, 5.51; 267/269, 270, 260, 267/267, 220, 179; 188/321.11; 384/448
See application file for complete search history.

(56) References Cited
U.S. PATENT DOCUMENTS

| | | | | |
|---|---|---|---|---|
| 4,773,635 A * | 9/1988 | Buma | ......................... | 267/220 |
| 4,971,348 A * | 11/1990 | Oyama et al. | ............ | 280/5.521 |
| 5,163,660 A * | 11/1992 | Yamaoka et al. | ............ | 267/136 |
| 5,226,635 A * | 7/1993 | Nakamura | .................... | 267/220 |
| 5,330,166 A * | 7/1994 | Aoki | ........................... | 267/220 |
| 5,947,459 A * | 9/1999 | Ducloux et al. | ............ | 267/221 |

* cited by examiner

*Primary Examiner*—Paul N. Dickson
*Assistant Examiner*—George D Spisich
(74) *Attorney, Agent, or Firm*—Arent Fox PLLC

(57) ABSTRACT

A suspension stop for a motor vehicle wheel assembly comprising a fixed member adapted to be fixed to the chassis (2) of the vehicle and a rotating member adapted to be fixed to the suspension spring (4) so as to be rotationally moved under the effect of the forces exerted by the spring. The stop includes a device for measuring the vertical forces applied to the vehicle wheel. The device includes a pulse-generating coder (11) fixed to one of the members, a sensor (12) fixed to the other member which is able to detect these pulses so as to determine the angular position of the rotating member with respect to the fixed member, and a calculation device able, from this position, to calculate the corresponding vertical force applied.

A method of measuring the vertical forces applied to a wheel associated with the chassis (2) of a vehicle by such a stop is also provided.

14 Claims, 7 Drawing Sheets

ROTATING INSTRUMENTED SUSPENSION STOP FOR MEASURING VERTICAL FORCES

BACKGROUND OF THE INVENTION

The invention concerns a suspension stop for a motor vehicle wheel as well as a method of measuring the vertical forces applied to a wheel associated with the chassis of a vehicle by means of such a stop.

Known stops conventionally comprise a fixed member intended to be secured to the vehicle chassis and a rotating member intended to be fixed with respect to rotation to the suspension spring.

In particular, the stops can comprise a bearing provided with a fixed top race, a rotating bottom race and rolling bodies disposed between the said races.

Thus the stops make it possible to connect the wheels to the chassis of the vehicle by means of suspensions and associated springs, leaving the wheels free to move angularly and withstanding the multiaxial forces due to the running conditions (acceleration, braking, the state of the surface, cornering, etc).

In particular, the vertical forces cause a variation in the compression of the spring and therefore a coiling of its turns on themselves, which gives rise to a rotation of the rotating member with respect to the fixed member.

Moreover, it is desirable to measure the forces suffered by the vehicle wheels, in particular for the requirements of a certain number of electronic assistance systems on the vehicle, for example intended for active safety, driving comfort (in particular suspension control) or a reduction in fuel consumption.

For this purpose, it is known how to directly measure the forces exerted by the road on the vehicle, these measurements being made either at the tyre or at the components of the wheel set. However, these measurement strategies have a certain number of limitations.

In particular, when the measurement is made on the tyre, which is a rotating component, there are posed problems of transmitting the signal in a fixed reference frame so as to be able to derive the modulus of forces therefrom, and this all the more critically since the signals are numerous and must be analysed in real time in order to be able to control the assistance systems.

Concerning the measurement on the wheel-set components, the main problem which is posed is that of the analysis of the signals in order to derive therefrom the modulus of forces respectively in the three directions in space. This is because the application of a transverse force to the bottom of the wheel creates a moment of tilt at the bearing which is due to the lever arm represented by the radius of the wheel. The effect of the transverse force will therefore be preponderant on the effect of the vertical force, which makes the exact determination of this vertical force difficult.

SUMMARY OF THE INVENTION

To resolve these drawbacks, the invention proposes to measure, at the vehicle suspension stop, the vertical forces applied to the wheel of the said vehicle, and this indirectly by measuring continuously the angular movements of the rotating member which are caused by the said vertical forces.

To this end, and according to a first aspect, the invention proposes a suspension stop for a motor vehicle wheel of the type comprising a fixed member intended to be fixed to the chassis of the vehicle and a rotating member intended to be fixed to the suspension spring so as to be rotationally moved under the effect of the forces exerted by the said spring, the said stop comprising a device for measuring the vertical forces applied to the vehicle wheel, the said device comprising a pulse-generating coder which is fixed to one of the members, a sensor fixed to the other member which is able to detect these pulses so as to determine the angular position of the rotating member with respect to the fixed member, and a calculation means able, from this position, to calculate the corresponding vertical force applied.

According to one embodiment, the stop comprises a bearing provided with a fixed top race forming the fixed member, a rotating bottom race forming the rotating member and rolling bodies disposed between the said races.

According to a second aspect, the invention proposes a method of measuring the vertical forces applied to a wheel associated with the chassis of a motor vehicle by means of such a stop, in which, in addition to the angular position of the rotating race, the steering angle of the wheels and/or the value of the degree to which the suspension is pressed down are used by the calculation means.

BRIEF DESCRIPTION OF THE DRAWINGS

Other objects and advantages of the invention will emerge during the following description, given with reference to the accompanying drawings, in which.

DETAILED DESCRIPTION OF THE INVENTION

Figure 1:
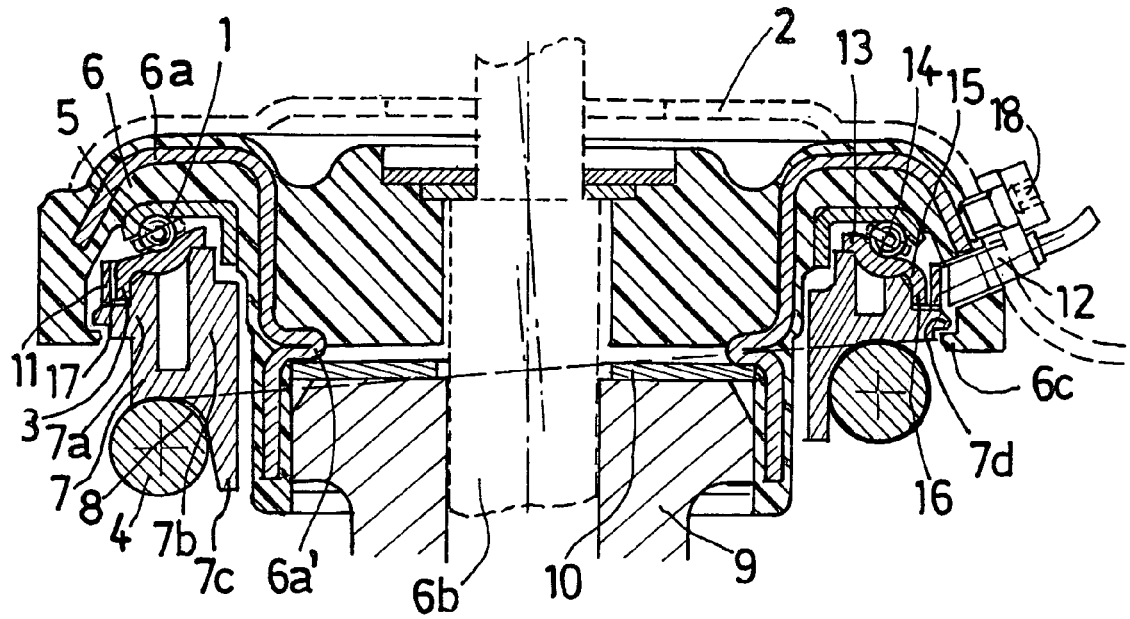
FIGS. 1 to 6 are partial views in longitudinal section of a stop in which the coder is associated with the bottom race respectively according to five embodiments.

In relation to the figures, a suspension stop is described for a motor vehicle wheel which comprises a bearing provided with a fixed top race 1 which is secured to the chassis 2 of the vehicle, a rotating bottom race 3 which is rotationally fixed to the suspension spring 4 and rolling bodies 5 disposed between the said races so as to allow the relative rotation of the said races about one axis. In particular, a rotation of a few degrees is caused by the angular movement of the wheels (the steering angle) and by the vertical or axial forces which are applied to the wheel.

In the remainder of the description the terms "top" and "bottom" are defined with respect to respectively top and bottom locations in the suspension stops as depicted in the figures, the terms "internal" and "external" are defined with respect to locations respectively close to or far away from the rotation axis, the terms "vertical" or "axial" and "transverse" or "radial" are defined with respect to a plane respectively parallel and perpendicular to the rotation axis.

In the embodiments depicted, the suspension stop comprises a top cup 6 associated with the top race 1, the said cup being associated with the chassis 2, and a bottom cup 7 associated with the bottom race 3.

The bottom cup 7 is formed by an essentially annular piece which comprises a housing 8 in which the end part of the spring 4 comes in abutment whilst providing a relative rotational fixing of the spring 4 on the bottom cup 7. Thus the vertical forces exerted by the spring 4 on the bottom cup 7 are converted, because of the coiling of the turns of the spring 4, into an angular movement of the bottom race 3 with respect to the top race 1. The bottom cup 7 is for example obtained by moulding a thermoplastic material of the polyamide 6.6 type.

The top cup 6 is formed by an essentially annular piece which, in the embodiments depicted, is formed from rubber moulded onto an annular reinforcing insert 6a, the said cup comprising a bore 6b arranged so as to receive the end of the rod of the suspension damper.

The insert 6a comprises a radial annular part and a cylindrical skirt extending axially downwards from the external edge of the radial part. The axial skirt comprises an annular radial fold 6a' for the abutment of a snubber 9 by means of an insert 10 mounted on the said snubber.

The snubber 9 comprises an axial annular part and a cylindrical skirt extending axially downwards from the external edge of the radial part.

The races 1, 3 of the bearing each consist of a pressed sheet metal ring which are respectively associated, for example by force-fitting, with the two cups 6, 7, the said races comprising raceways disposed facing each other so as to receive the running bodies 5 which, in the embodiments depicted, are spherical. In particular, the geometries of the cups 6, 7 and of the associated races 1, 3 are arranged so as to allow reliable fixing of the races 1, 3 on the cups 6, 7, in particular vis-à-vis radial forces.

Although the description of the invention is given in relation to a suspension stop of the "third generation" type in which the filtering block is integrated in the top cup 6, the invention can be directly transposed by a person skilled in the art to suspension stops having another general structure, that is to say in which the various functional members of the stop are arranged differently. In addition, the description given is also directly transposable to a suspension stop of the type without a roller bearing, for example of the plain bearing type or comprising an elastomeric piece which is deformable under torsion, the said stop always comprising a fixed member and a member rotating under the effect of the forces exerted by the spring 4. This is because the invention concerns the integration of the suspension stop of a device for measuring the vertical or axial forces applied to the vehicle wheel.

The measuring device described in relation to the figures comprises a coder 11 generating pulses which is rotationally fixed to the rotating race 3, a sensor 12 fixed with respect to the coder 11 which is able to detect these pulses so as to determine the angular position of the rotating race 3 and a calculation means able, from this position, to calculate the corresponding vertical force applied.

In a variant, having regard to the small magnitude of rotation of the rotating member under the effect of the forces exerted by the spring 4, it can also be envisaged that the sensor 12 be fixed to the rotating member and that the coder 11 be fixed to the fixed member.

In a particular example, the coder 11 is formed by a multipole magnetic ring made from synthetic material containing ferrite particles on which a plurality of pairs of North and South poles are magnetised, equally distributed with a constant angular width.

The associated sensor 12 can comprise at least two sensitive elements which are for example chosen from the group comprising Hall effect sensors, magnetoresistors and giant magnetoresistors.

The sensor 12 used is able to deliver two periodic electrical signals S1, S2 in quadrature. The principal of obtaining the signals S1 and S2 from a plurality of aligned sensitive elements is for example described in the document FR-2 792 403 issuing from the applicant.

The sensor 12 also comprises an electronic circuit which, from the signals S1, S2, delivers square digital signals A, B in quadrature which represent the angular position of the coder 11, and therefore of the rotating race 3, with respect to the fixed sensor 12.

According to one embodiment, the sensor 12 also comprises an interpolator, for example of the type described in the document FR-2 754 063 issuing from the applicant, in order to increase the resolution of the output signals.

The sensor 12 can be integrated on a silicon substrate or equivalent, for example AsGa, so as to form an integrated circuit personalised for a specific application, a circuit sometimes designated by the term ASIC in order to refer to the integrated circuit designed partially or completely according to requirements.

According to the invention, it is therefore possible to measure the vertical forces applied to a wheel associated with the chassis 2 of a motor vehicle by means of the stop.

This is because it is possible to determine a behaviour law for the spring 4 according to the vertical forces, for example resulting from theory or an initial calibration, and to use this law in the calculation means in order to link the rotation of the rotating member which is measured to the vertical force which is undergone.

In addition, the calculation means can use the wheel steering angle, for example known by means of a sensor for the steering angle on the vehicle steering wheel, and/or the value of the degree to which the suspension is pressed down, so as to decorrelate the components of the rotation of the rotating member which are due respectively to the axial forces and the steering angle, so as to obtain the vertical forces independently of this steering angle.

Although the description is made in relation to a coder/magnetic sensor assembly, it is also possible to implement the invention in a similar manner using an equivalent technology, for example of the optical type. For example, the coder 11 may be formed from a metal or glass target on which there have been etched optical patterns similar to the multipole magnetic patterns disclosed above, the sensitive elements then being formed from optical detectors.

In relation to FIGS. 1 to 6, five embodiments of the association of the coder 11 on the bottom race 3 are described.

Figure 2:
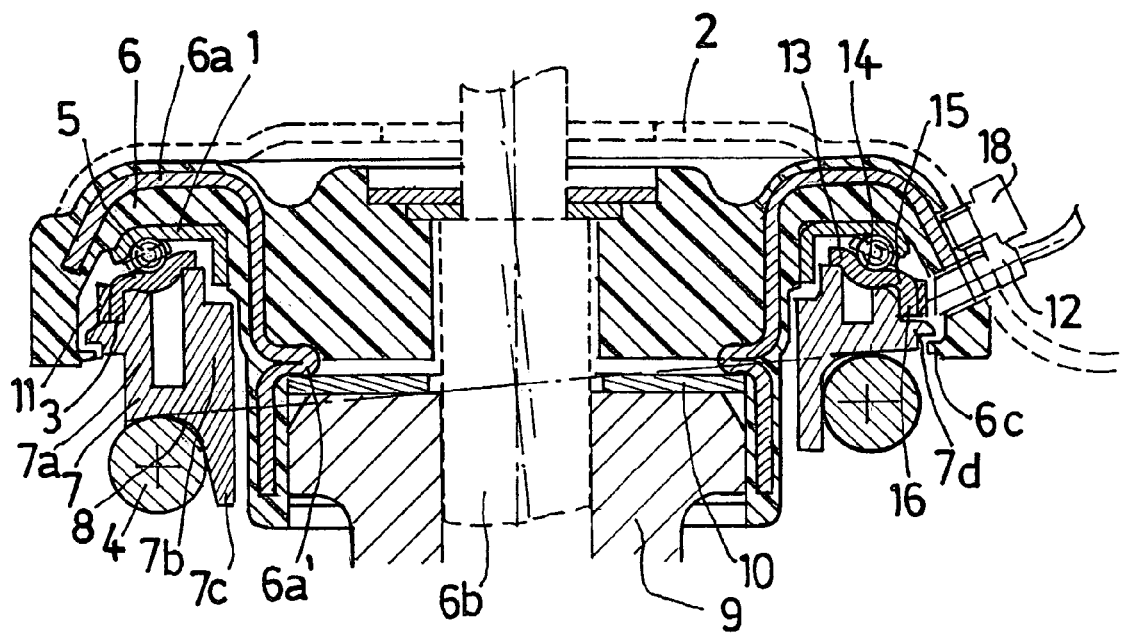

In FIGS. 1 and 2, the coder 11 is associated with the bottom race 3 so as to allow radial reading of the pulses issuing from the coder 11, the said race comprising, from inside to outside and connected together, a radial ring 13, the raceway 14 and a ring comprising a radial part 15 and an axial part 16. The internal ring 13 is offset axially upwards with respect to the radial part 15. The bottom cup 7 comprises, on the upper side, two cylindrical projections 7a, 7b intended to be housed respectively against a ring 13, 15 so as to provide a reliable connection of the bottom race 3 to the cup 7. Moreover, the bottom cup 7 comprises, on the bottom side, a cylindrical projection 7c which forms the axial wall of the housing 8, the radial wall of the said housing being formed by the bottom face of the body of the bottom cup 7.

In FIG. 1 the coder 11 is moulded onto an annular cylindrical surface of the frame 17 which is associated, for example by force fitting, on the axial bottom face of the axial part 16 so that the frame 17 comes into abutment on the radial external face of the axial part 16.

In FIG. 2, the coder 11 is directly moulded onto or adhesively bonded to the radial external face of the axial part 16.

In these two embodiments, the sensor 12 is associated with the chassis 2 by means of a screw 18, the said chassis and the top cup 6 comprising a housing intended to receive the said sensor so as to position the sensitive elements opposite to and at an air gap distance from the coder 11. In addition, the reliability of this positioning is improved by the fact that the coder 11 is in abutment on the axial part 16 and that the sensor 12 comprises a bevelled end making it possible to dispose the sensitive elements in a plane substantially parallel to the plane of the coder 11, without interfering with the coder 11 when it rotates.

Figure 3:
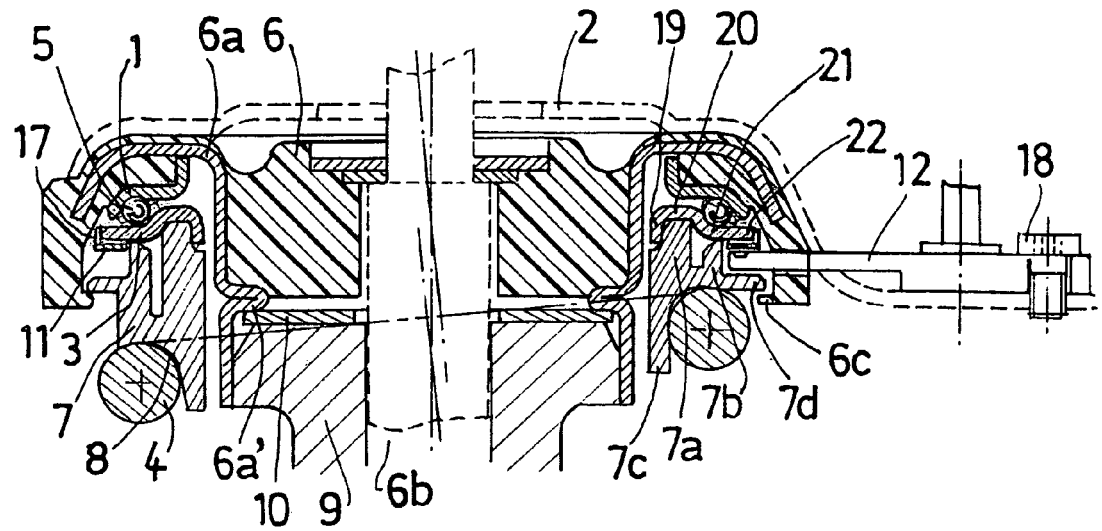
Figure 4:
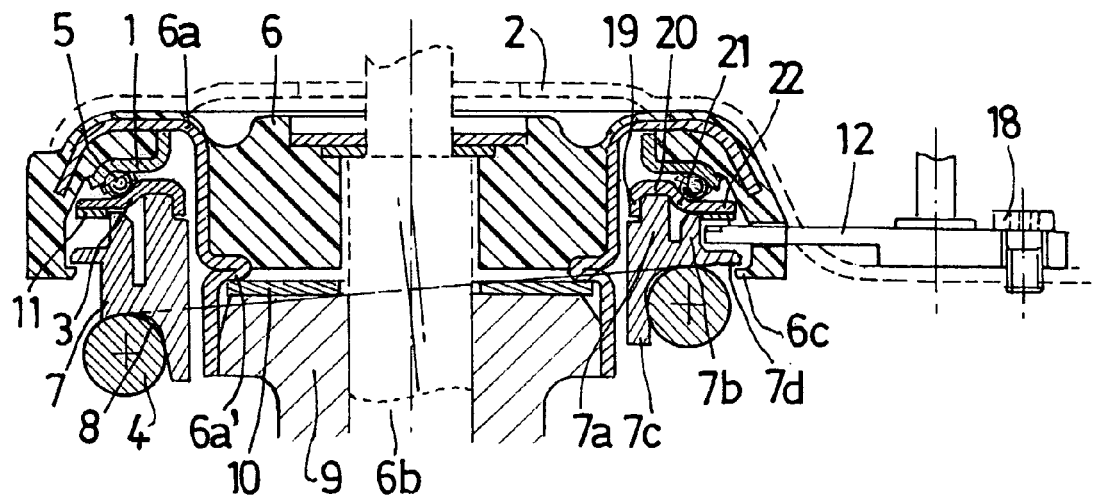

In FIGS. 3 and 4, the coder 11 is associated with the bottom race 3 so as to allow axial reading, the said race comprising, from inside to outside and connected together, a ring comprising an axial part 19 and a radial part 20, the raceway 21 and a radial ring 22. The radial part 20 is offset axially upwards with respect to the external ring 22. The bottom cup 7 has a geometry similar to that described in relation to FIGS. 1 and 2.

In FIG. 3 the coder 11 is moulded onto an annular cylindrical surface 17 of a frame which is associated, for example by force fitting, on the radial external face of the external ring 22 so that the frame 17 comes into abutment on the axial bottom face of the external ring 22.

In FIG. 4, the coder 11 is directly moulded onto or adhesively bonded to the axial bottom face of the external ring 22.

In these two embodiments, the sensor 12 is associated with the chassis 2 by means of a screw 18, the said chassis and the top cup 6 comprising a housing intended to receive the said sensor so as to position the sensitive elements opposite to and at an air gap distance from the coder 11. In addition, the reliability of this positioning is improved by the fact that the coder 11 is in abutment on the external ring 22. Moreover, the sensor 12 has a geometry arranged so as to allow association on an area of the chassis 2 which is provided at a distance from the stop.

Figure 5:
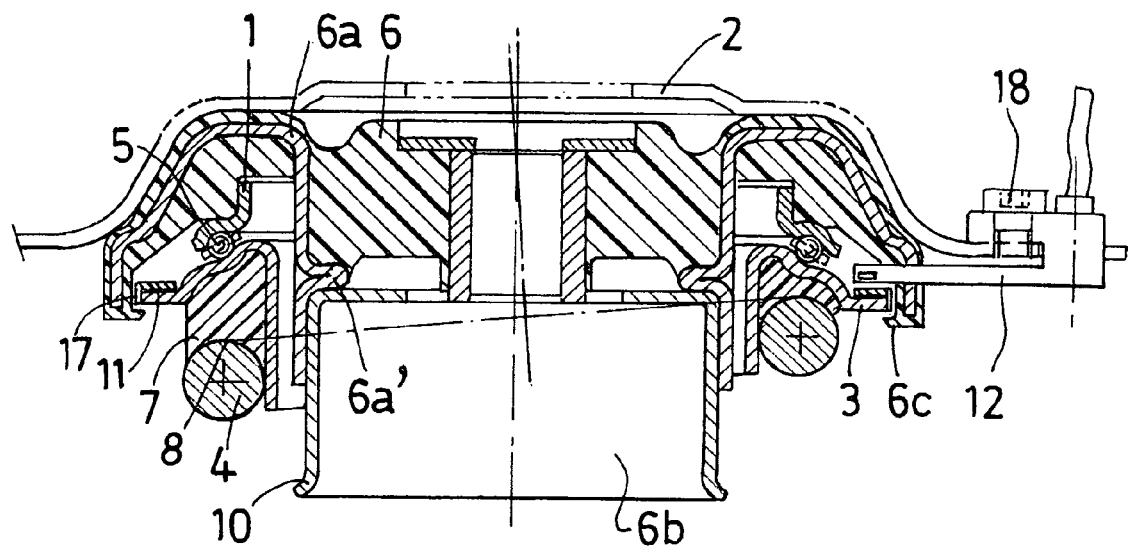
Figure 6:
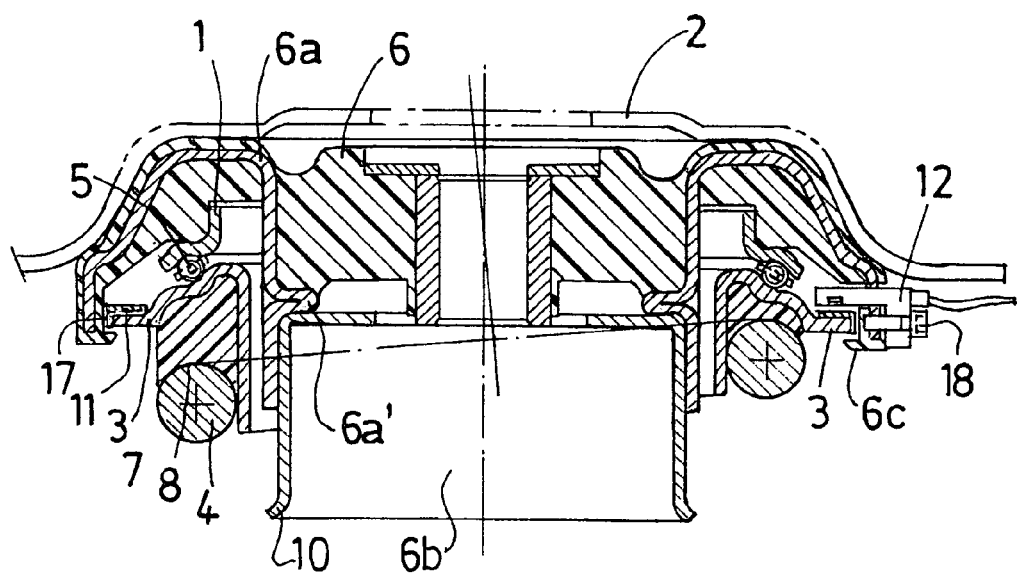

In FIGS. 5 and 6, the coder 11 is also associated with the bottom race 3 so as to allow axial reading, this embodiment differs from those in FIGS. 3 and 4 by the fact that the coder 11 is associated on an axial top face of the bottom race 3. In addition, in the embodiment in FIGS. 5 and 6, the bottom cup 7 does not comprise any projections but has a top face which is arranged to match the shapes of the bottom race 3 so as to ensure their mutual association.

In FIG. 5, the sensor 12 is associated with the chassis 2 in a similar fashion to that in FIGS. 3 and 4. In FIG. 6, the sensor 12 is associated on the insert 6a of the top cup 6 by means of a screw 18, the said insert comprising a housing intended to receive the said sensor so as to position the sensitive elements opposite to and at an air gap distance from the coder 11. In this embodiment, the sensor 12 is therefore integrated in the suspension stop.

Figure 7:
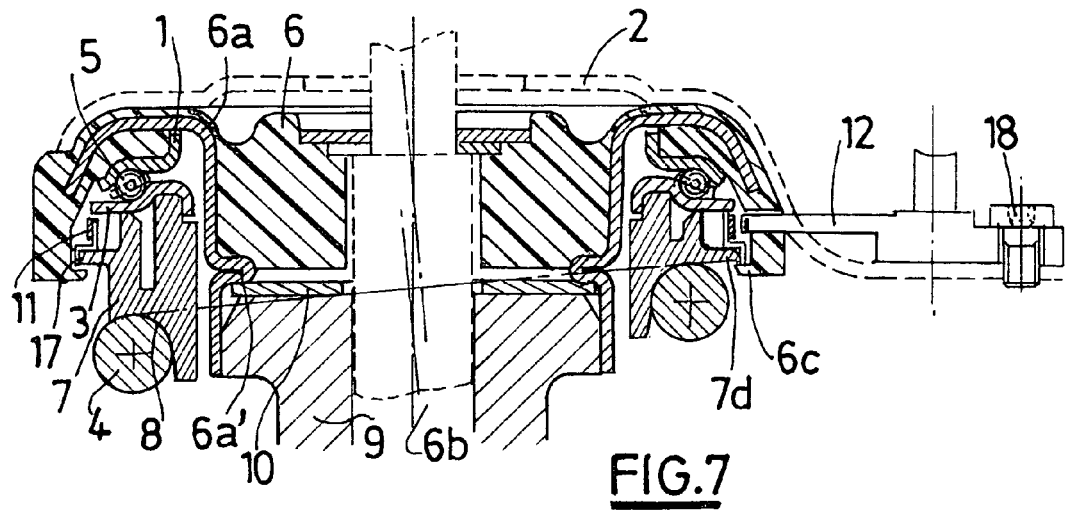
FIGS. 7 to 9 are partial views in longitudinal section of a stop in which the coder is associated with the bottom cup respectively according to three embodiments.
Figure 8:
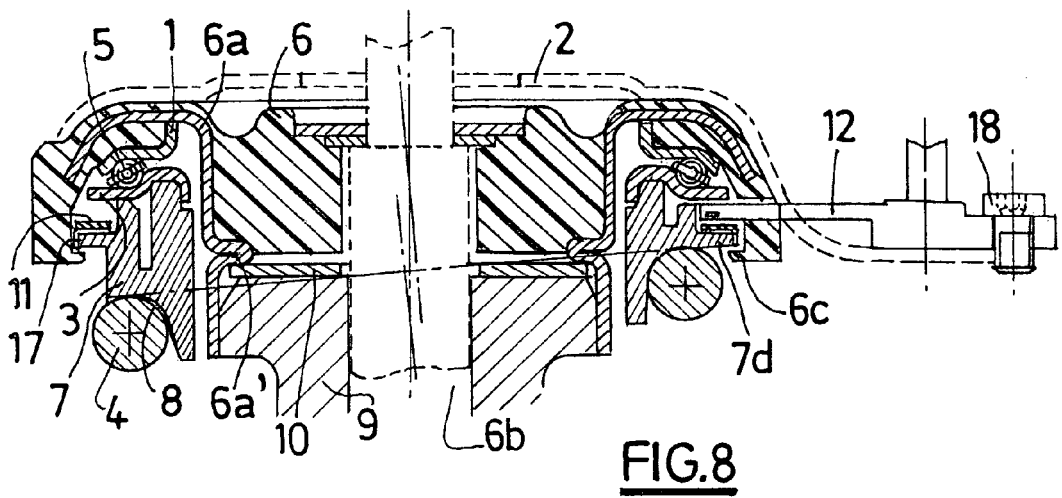
Figure 9:
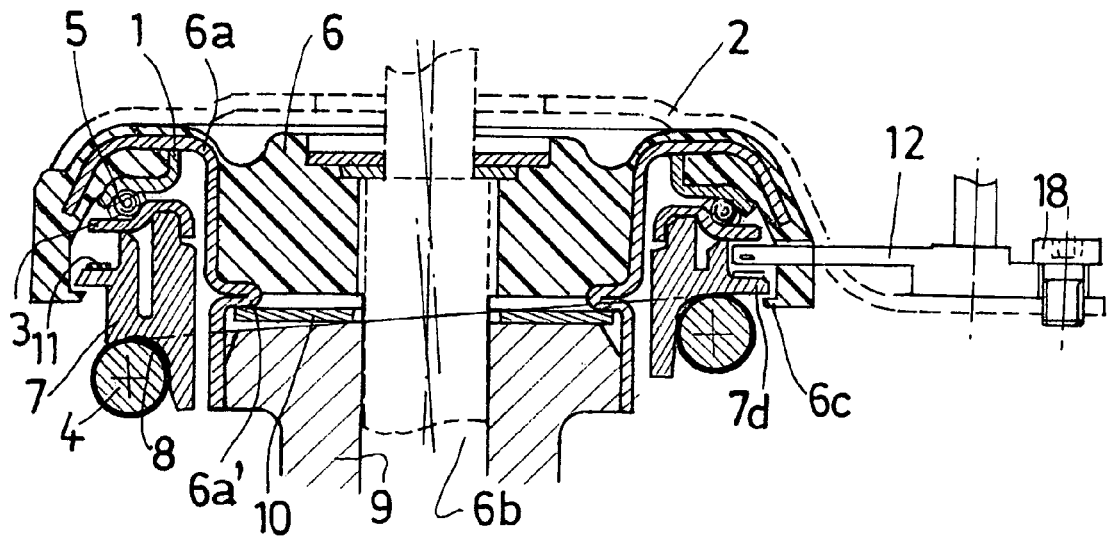

In FIGS. 7 to 9, the coder 11 is associated with the bottom cup 7 respectively according to three embodiments, the bottom cup 7 having a geometry similar to that described in relation to FIGS. 1 and 2 and the coder 11 being associated on an external end 7d of the said cup.

In FIGS. 7 and 8, the coder 11 is moulded onto an annular cylindrical surface of the frame 17 which is associated, for example by snapping on, on the radial external face of the end 7d. The frame 17 is arranged so as to allow a respectively radial and axial reading of the pulses issuing from the coder 11. In addition, the sensor 12 and its association are similar to those described in relation to FIGS. 3 and 4, with the sensitive elements disposed in the said sensor so as to allow reading of the pulses according to the two embodiments.

Figure 8A:
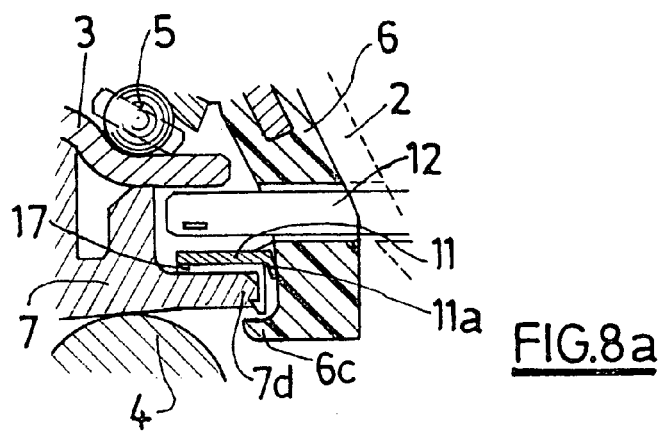
FIG. 8a is an enlarged view of part of FIG. 8 showing the coder according to a variant in which it comprises an extension forming a dynamic sealing means.

FIG. 8a depicts a variant of the coder depicted in FIG. 8 in which the said coder comprises an extension 11a intended to rub on the radial internal face of the top cup 6 so as to form a dynamic sealing means for the measuring device. In a variant, to provide the dynamic seal, the cup 6, 7 can comprise extensions intended to come into rubbing contact on part of the stop. In addition, in particular in this figure, the ends 7d, 6c of the bottom 7 and top 6 cups have a geometry arranged in order to cooperate so as to form a static sealing means for the measuring device. This is because external pollution is thus prevented from entering inside the stop, which in particular protects the coder 11 and sensor 12 from any contaminants.

FIG. 9 depicts an embodiment similar to that in FIG. 8 in which the coder 11 is moulded or adhesively bonded directly onto the bottom cup 7.

Figure 10:
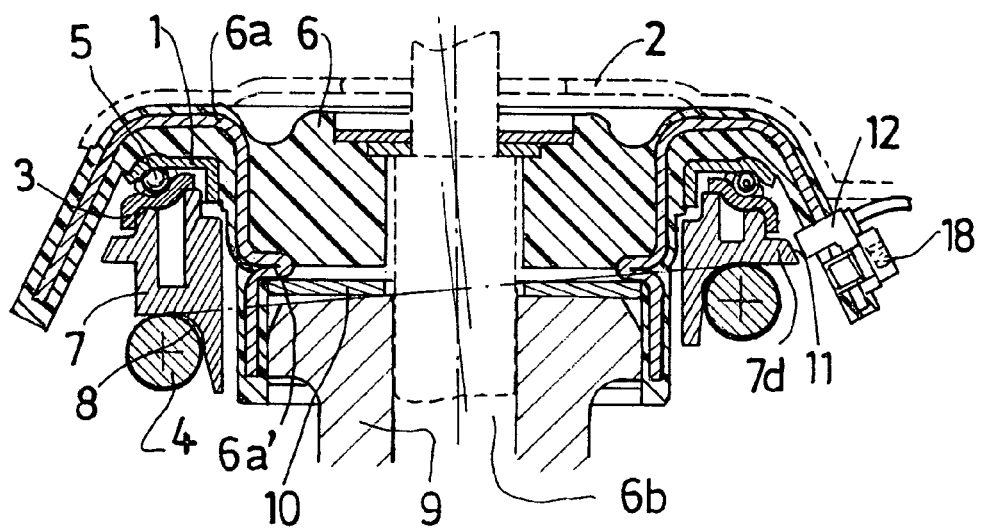
FIG. 10 is a partial view in longitudinal section of a stop in which the coder is produced in part of the bottom cup.

In the embodiment depicted in FIG. 10, the bottom cup 7 has a structure similar to that described in relation to FIGS. 1 and 2. In addition, the bottom cup 7 comprises an end 7d on the external radial surface of which the coder 11 is produced. To this end, the bottom cup 7 is produced from polyamide 6.6 containing ferrite particles, which makes of it a directly magnetisable piece on which it is therefore possible to imprint the succession of North and South poles. Moreover, as in FIG. 6, the sensor 12 is fixed to the insert 6a of the top cup 6. The sensor 12 comprises an end arranged so as to allow the arrangement of the sensitive elements in a plane substantially parallel to the plane of the coder 11, which is inclined.

In FIGS. 11 to 14, four embodiments of the association of the sensor 12 are depicted.

Figure 11:
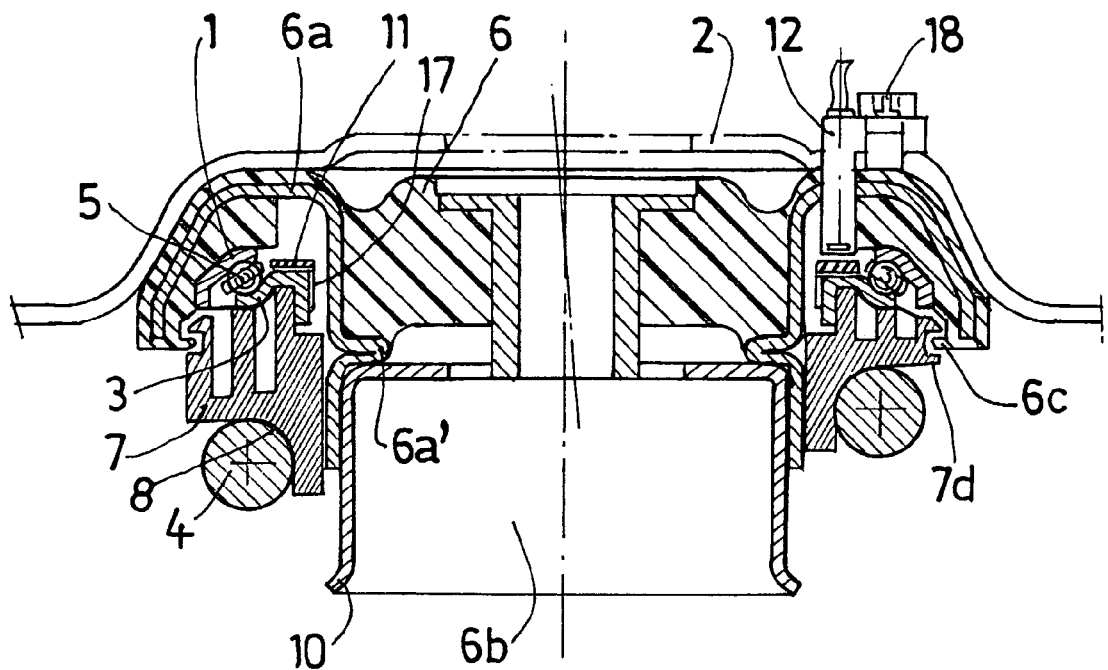
FIGS. 11 to 14 are partial views in longitudinal section of a stop in which the sensor is disposed respectively according to four embodiments.
Figure 12:
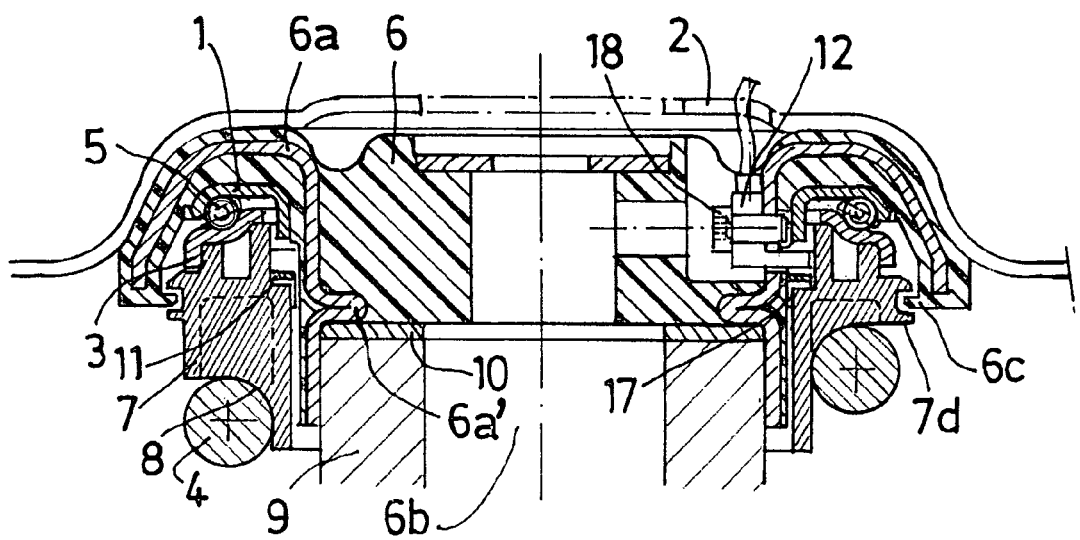

In the embodiments in FIGS. 11 and 12, the sensor 12 is associated on an internal part of the stop so as to improve the compactness of the said stop.

In FIG. 11, the sensor 12 is associated with the chassis 2 and the coder 11 is associated on an internal top face of the bottom race 3. A housing is provided in the chassis 2 and in the insert 6a of the top cup 6 so as to receive the sensor by positioning the sensitive elements opposite to and at an air gap distance from the coder 11.

In FIG. 12, the sensor 12 is associated with the insert 6a of the top cup 6 and the coder 11 is associated on an internal top face of the bottom cup 7, so as to position the sensitive elements opposite to and at an air gap distance from the coder 11.

Figure 13:
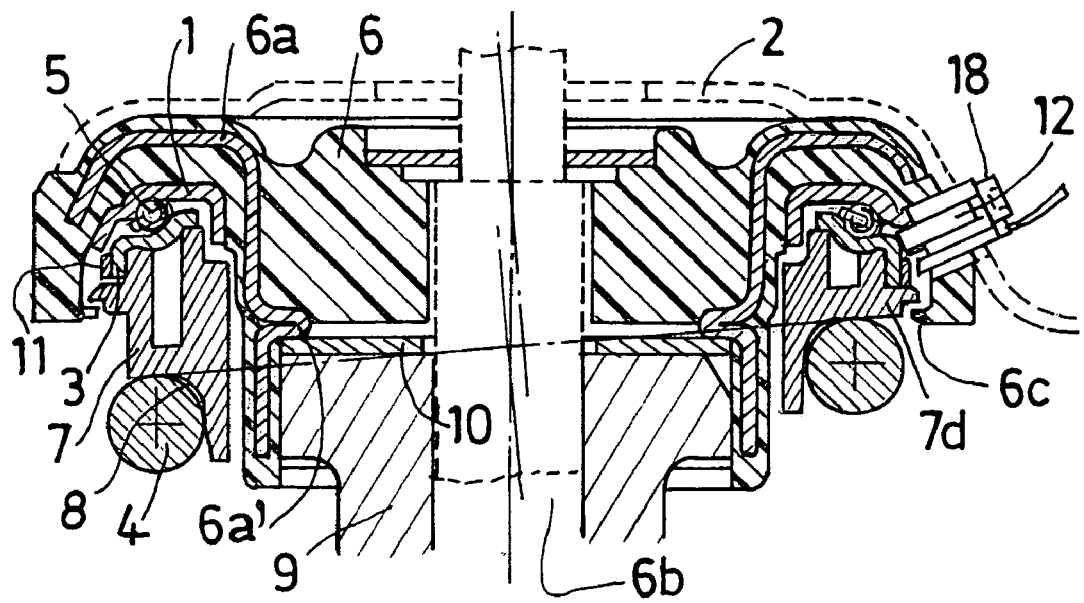
Figure 14:
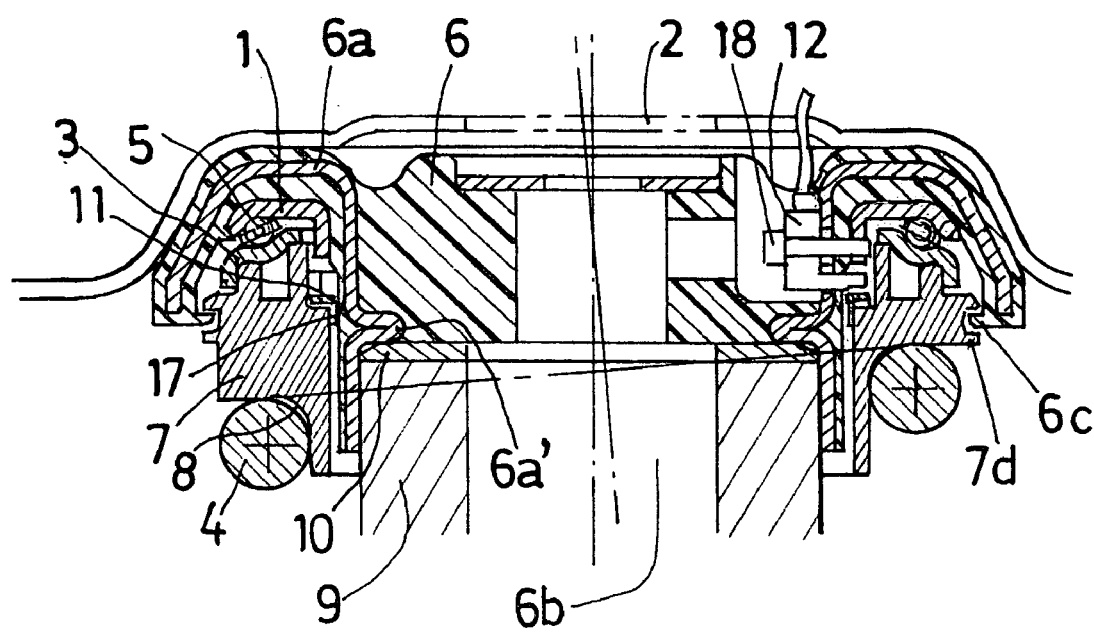

In the embodiments in FIGS. 13 and 14, the sensor 12 is also integrated in the stop whilst being associated with the top race 1, respectively on an external part and on an internal part thereof. Moreover, these two figures also show two embodiments of the extensions 6c, 7d of the cups 6, 7 which cooperate so as to form a static sealing means.

The invention claimed is:

1. A suspension stop for a motor vehicle wheel assembly, the wheel assembly comprising a fixed member adapted to be fixed to a chassis of a vehicle and a rotating member adapted to be fixed to a suspension spring so as to be rotationally moved under the effect of the forces exerted by the spring, said stop comprising a device for measuring vertical forces applied to the vehicle wheel, the device comprising a pulse-generating coder fixed to one of the members, a sensor fixed to the other member and able to detect pulses from the coder so as to determine the angular position of the rotating member with respect to the fixed member, and a calculation means for calculating, from this position, the corresponding vertical force applied.

2. The stop according to claim 1, further comprising a bearing provided with a fixed top race forming the fixed member, a rotating bottom race forming the rotating member and rolling bodies disposed between the races.

3. The stop according to claim 2, further comprising a top cup associated with the top race and adapted to be associated with the chassis, and a bottom cup associated with the bottom race and provided with a housing adapted to fixedly receive an end of the suspension spring.

4. The stop according to claim 3, the sensor is associated with the top cup so that sensitive elements of the sensor are positioned opposite to and at an air gap distance from the coder.

5. The stop according to claim 2, wherein the sensor is associated with the top race so that sensitive elements of the sensor are positioned opposite to and at an air gap distance from the coder.

6. The stop according to claim 1, wherein the sensor is associated with the chassis so that sensitive elements of the sensor a repositioned opposite to and at an air gap distance from the coder when the stop is mounted on the chassis.

7. The stop according to claims 1, wherein the sensor comprises sensitive elements chosen from amongst Hall effect sensors, magnetoresistors and giant magnetoresistors.

8. The stop according to claim 1, wherein the coder is formed from a multipole magnetic ring made from synthetic material containing ferrite particles on which there are magnetised a plurality of pairs of North and South poles equally distributed with a constant angular width.

9. A method of measuring vertical forces applied to a wheel associated with the chassis of a motor vehicle by means of a stop according to claim 1, in which, in addition to the angular position of the rotating member, the steering angle of the wheels and/or the value of the extent to which the suspension is pressed down are used by the calculation means.

10. The stop according to claim 3, wherein the bottom and top cups comprise extensions which cooperate so as to form a static sealing means.

11. The stop according to claim 3, wherein at least one of the coder and the cups comprise extensions which rub on one face of the stop so as to form a dynamic sealing means.

12. The stop according to any one of claims 2 to 6, wherein the coder is associated with the bottom race.

13. The stop according to anyone of claims 3 to 6, wherein the coder is associated with the bottom cup.

14. The stop according to any one of claims 3 to 6, wherein the bottom cup comprises a part on which the coder is produced.

* * * * *